US012747588B2

(12) United States Patent
Ayres

(10) Patent No.: US 12,747,588 B2
(45) Date of Patent: Sep. 29, 2026

(54) COLLATED REBAR CLIP

(71) Applicant: Donald B. Ayres, Northbrook, IL (US)

(72) Inventor: Donald B. Ayres, Northbrook, IL (US)

( * ) Notice: Subject to any disclaimer, the term of this patent is extended or adjusted under 35 U.S.C. 154(b) by 172 days.

(21) Appl. No.: 18/593,655

(22) Filed: Mar. 1, 2024

(65) Prior Publication Data

US 2024/0344323 A1 Oct. 17, 2024

Related U.S. Application Data

(60) Provisional application No. 63/459,619, filed on Apr. 15, 2023.

(51) Int. Cl.

| | |
|---|---|
| ***E04C 5/16*** | (2006.01) |
| ***E04C 5/20*** | (2006.01) |
| ***E04G 21/18*** | (2006.01) |
| ***F16B 15/08*** | (2006.01) |

(52) U.S. Cl.

CPC .............. *E04C 5/167* (2013.01); *E04C 5/168* (2013.01); *E04C 5/163* (2013.01); *E04C 5/166* (2013.01); *E04C 5/20* (2013.01); *E04G 21/185* (2013.01); *F16B 15/08* (2013.01)

(58) Field of Classification Search

CPC .......... E04C 5/167; E04C 5/168; E04C 5/163; E04C 5/20; E04C 5/166; F16B 15/08; E04G 21/185

See application file for complete search history.

(56) References Cited

U.S. PATENT DOCUMENTS

| | | | |
|---|---|---|---|
| 1,986,528 | A | 1/1935 | Ranger |
| 2,702,182 | A | 2/1955 | Wenger |

(Continued)

FOREIGN PATENT DOCUMENTS

| | | | |
|---|---|---|---|
| FR | 2525708 | A1 | 10/1983 |
| WO | 1994013902 | A2 | 6/1994 |

(Continued)

OTHER PUBLICATIONS

International Search Report and Written Opinion of International Searching Authority issued in PCT Patent Application No. PCT/US24/22688 mailed Aug. 5, 2024. 17 pages.

(Continued)

*Primary Examiner* — Omar F Hijaz
(74) *Attorney, Agent, or Firm* — Lempia Summerfield Katz LLC

(57) ABSTRACT

A fastener assembly made up of separate clips for binding rebars together are serially connected by a carrier to form a series of clips that are separable when applied to the rebars. Each clip comprises a body having a first channel holding a first rebar and a second channel holding a second rebar underlying and transverse to the first rebar. Each channel has a bottom gap allowing a rebar to be positioned in its respective channel. The first rebar is held within the first channel by the second rebar, and the second rebar is held within the second channel by the clip body. Each clip may include at least one groove for attachment of the carrier. The rebar clips may be integrally formed from plastic or other suitable material. The carrier is flexible and severable allowing the clip string to be coiled and individual clips separated from the string.

14 Claims, 6 Drawing Sheets

(56) References Cited

U.S. PATENT DOCUMENTS

| | | | | | |
|---|---|---|---|---|---|
| 3,004,370 | A * | 10/1961 | Tinnerman | F16B 7/0493 | 52/719 |
| 3,360,883 | A | 1/1968 | Glanzer | | |
| 3,613,878 | A | 10/1971 | Langas et al. | | |
| 3,694,988 | A | 10/1972 | Skold | | |
| 3,722,670 | A * | 3/1973 | Plunkett | B25B 27/146 | 206/340 |
| 4,110,951 | A | 9/1978 | Padrun | | |
| 4,388,791 | A | 6/1983 | Anderson | | |
| 4,617,775 | A | 10/1986 | Padrun | | |
| 4,791,014 | A | 12/1988 | West | | |
| 4,991,372 | A | 2/1991 | Sonneville | | |
| 5,314,064 | A * | 5/1994 | Wells | F16B 15/08 | 206/820 |
| 5,314,065 | A * | 5/1994 | Ayres | B25C 5/16 | 206/340 |
| D355,582 | S | 2/1995 | Sleight | | |
| 5,564,564 | A | 10/1996 | Poffenberger | | |
| 5,598,682 | A | 2/1997 | Haughian | | |
| 5,626,436 | A | 5/1997 | Dragone | | |
| 5,878,546 | A | 3/1999 | Westover | | |
| 5,878,880 | A * | 3/1999 | Poffenberger | F16B 15/0015 | 206/346 |
| 5,893,252 | A | 4/1999 | Hardy, Jr. et al. | | |
| 5,927,491 | A * | 7/1999 | Room | F16B 15/08 | 206/340 |
| 6,112,494 | A | 9/2000 | Hardy, Jr. et al. | | |
| 6,161,360 | A | 12/2000 | Smith | | |
| 6,276,108 | B1 | 8/2001 | Padrun | | |
| 6,298,525 | B1 * | 10/2001 | Margo | F16L 3/237 | 24/339 |
| 6,317,970 | B1 * | 11/2001 | Leistner | B25B 27/146 | 29/816 |
| D529,794 | S | 10/2006 | Murray | | |
| D534,418 | S | 1/2007 | Minor | | |
| 7,241,071 | B2 | 7/2007 | Carraher et al. | | |
| 7,377,083 | B2 | 5/2008 | McCafferty et al. | | |
| 7,891,074 | B2 | 2/2011 | Kodi | | |
| 7,900,419 | B2 | 3/2011 | Kodi | | |
| 7,908,723 | B1 | 3/2011 | Kodi | | |
| 7,963,392 | B2 | 6/2011 | Kodi | | |
| 8,112,964 | B2 | 2/2012 | Baruh | | |
| 8,117,796 | B2 | 2/2012 | Kodi | | |
| 8,322,006 | B1 | 12/2012 | Kodi | | |
| 8,640,323 | B2 | 2/2014 | Kodi | | |
| 8,776,328 | B2 | 7/2014 | Kodi | | |
| 8,955,679 | B2 | 2/2015 | Kodi | | |
| D737,131 | S | 8/2015 | Frandsen | | |
| 9,267,288 | B2 | 2/2016 | Kodi | | |
| 9,394,692 | B2 | 7/2016 | Kodi | | |
| 9,797,148 | B2 | 10/2017 | Kodi | | |
| 9,816,273 | B2 | 11/2017 | Yi | | |
| 9,869,092 | B1 | 1/2018 | Rush | | |
| 10,519,660 | B2 | 12/2019 | Evans | | |
| 11,319,707 | B1 | 5/2022 | Ayres | | |
| 2004/0040247 | A1 | 3/2004 | Morse | | |
| 2004/0154261 | A1 | 8/2004 | Miller | | |
| 2005/0108976 | A1 | 5/2005 | Trangsrud | | |
| 2006/0059850 | A1 | 3/2006 | Minor | | |
| 2006/0248844 | A1 | 11/2006 | Kodi | | |
| 2007/0284385 | A1 | 12/2007 | Carraher et al. | | |
| 2008/0115448 | A1 | 5/2008 | Kodi | | |
| 2008/0115449 | A1 * | 5/2008 | Kodi | E04G 21/122 | 52/749.1 |
| 2008/0118304 | A1 | 5/2008 | Carraher et al. | | |
| 2009/0120030 | A1 | 5/2009 | Garza | | |
| 2010/0304117 | A1 * | 12/2010 | Scott | E04C 5/04 | 428/223 |
| 2013/0180200 | A1 | 7/2013 | Gavin | | |
| 2014/0026409 | A1 | 1/2014 | Liu et al. | | |
| 2014/0215955 | A1 | 8/2014 | Coleman | | |
| 2015/0152640 | A1 | 6/2015 | Kodi | | |
| 2016/0130814 | A1 | 5/2016 | Yun et al. | | |
| 2018/0044920 | A1 | 2/2018 | Kim et al. | | |
| 2018/0266110 | A1 | 9/2018 | Munsell et al. | | |
| 2018/0355614 | A1 | 12/2018 | Evans | | |

FOREIGN PATENT DOCUMENTS

| | | | |
|---|---|---|---|
| WO | 2006031407 | A3 | 3/2006 |
| WO | 2006033883 | A2 | 3/2006 |
| WO | 2013074123 | A2 | 5/2013 |

OTHER PUBLICATIONS

International Preliminary Report for International Application No. PCT/US2024/022688 mailed on Feb. 25, 2025.

* cited by examiner

Fig. 9
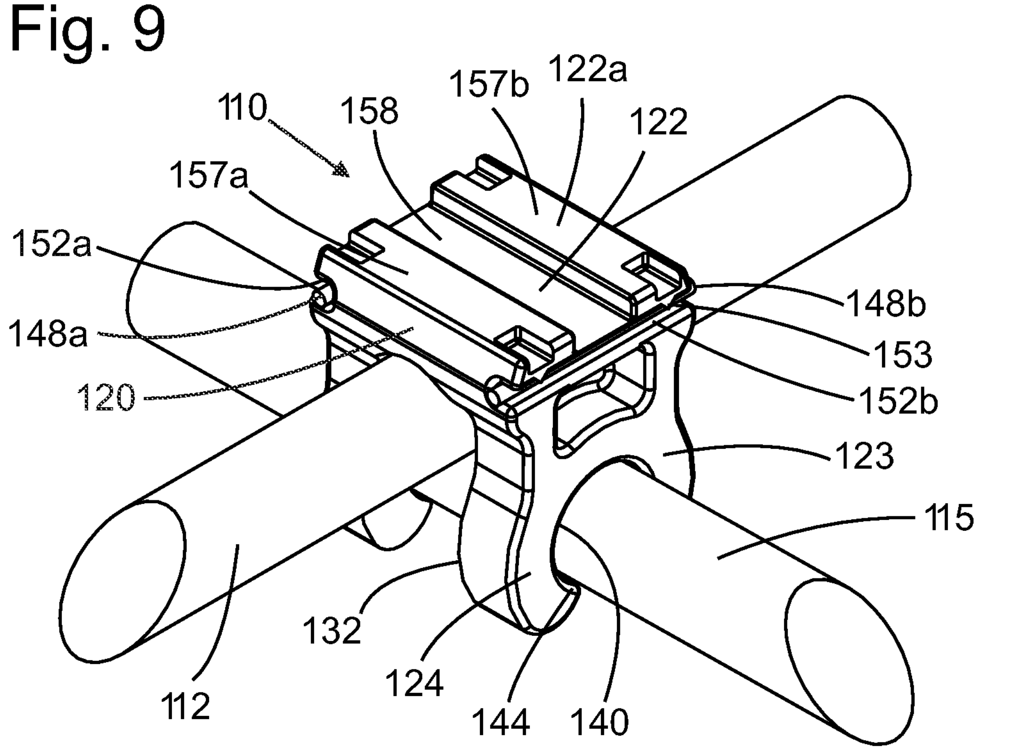
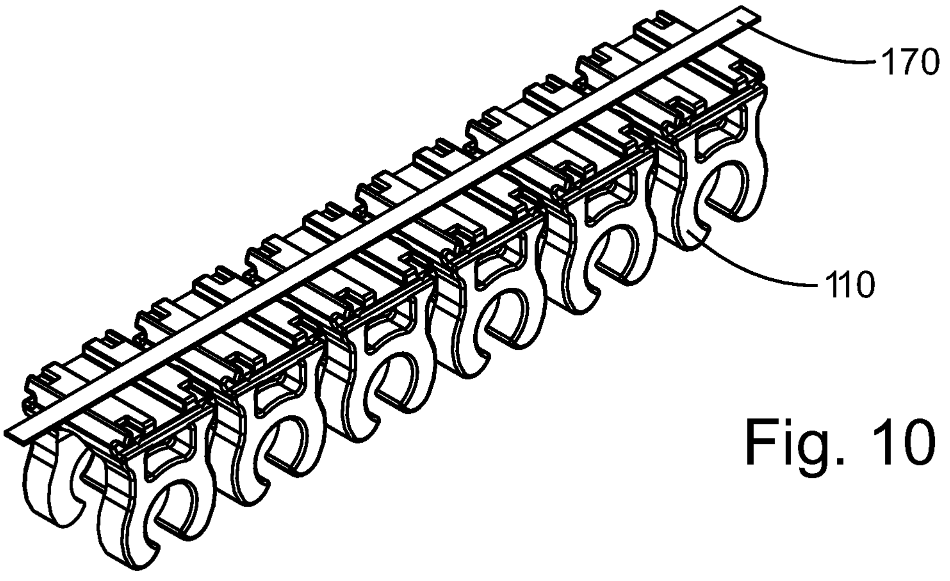
Fig. 10

COLLATED REBAR CLIP

CROSS REFERENCE TO RELATED APPLICATION

This application claims the benefit of and priority from U.S. Provisional Application Ser. No. 63/459,619 filed Apr. 15, 2023 (04/15/2023), the disclosures of which are herein incorporated by reference in their entireties.

TECHNICAL FIELD OF THE INVENTION

The present invention related to clips and, more particularly, to collated rebar clips used for binding rebars together.

BACKGROUND OF THE INVENTION

Concrete is a composite material made of fine and coarse aggregate bonded together with a fluid cement. After being poured and over time, it hardens and cures into a stone-like substance.

Concrete is a convenient material used to construct roads, buildings, and other manmade structures. It is very strong in compression, but it is weak in tension as the concrete holding the aggregate together can crack allowing the structure to fail. To prevent this, steel reinforcing bars, or rebar, is placed within the concrete during construction to add tensile strength and increase the tensile load that can be carried. Rebar is supplied as long, thick wires or rods and is usually arranged horizontally or vertically in a grid or matrix pattern to form a flat mat or curtain, or in a three-dimensional cage. Before concrete is poured over the rebar to encase it, the lengths of transversely intersecting rebar are joined together by short lengths of thin steel wire that is wrapped around the joints to tie or bind the rebar fixedly together preventing their relative movement. This is typically done manually and is a costly, time consuming, and backbreaking operation. It requires a worker to carry a wire reel or a supply of short wires and to constantly bend over while twisting the wires around the rebar with pliers or some other tool.

While rebar is typically formed from steel, other metals, plastics, and the like have been employed advantageously to reinforce concrete.

Molded plastic clips for binding rebar together are known and are available in short strips of clips. Because of the limited amount of clips making up a strip, there is a large amount of unproductive time spent reloading the installation tool used to apply the clips to rebar.

SUMMARY OF THE INVENTION

The present invention is directed to overcoming one or more of the problems as set forth above.

An object of the present invention is to provide a fastener assembly made up of separate rebar clips that is cost effective and may be applied quickly and efficiently by minimizing the amount of labor required to bind rebar together and reduce the time required to prepare application tools for operation.

Another object of the invention is to provide a large plurality of rebar clips that may be coiled, dispensed, and separated to efficiently allow the placement and binding of transverse, overlapping rebars at high rates with a tool that is manually or pneumatically operated.

In an exemplary embodiment of the invention, a large quantity of rebar clips are positioned along a flexible carrier which is rolled up into a helical coil.

In another exemplary embodiment, transverse channels are formed in a clip body and are configured to hold two overlapping rebars with a first rebar being held within a first channel by an underlying second rebar and with the second rebar, in turn, being held in a second channel by a narrowed gap preventing the separation of the second rebar from the clip.

In another exemplary embodiment, grooves are defined in the face of the rebar clip with each being adapted to receive and retain a flexible carrier which can be severed to separate individual rebar clips from other clips connected to the carrier.

In another exemplary embodiment, the clip is formed from plastic as a single, integral, unitary body.

BRIEF DESCRIPTION OF DRAWINGS

The details of construction and operation of the invention are more fully described with reference to the accompanying drawings which form a part hereof and in which like reference numerals refer to like parts throughout.

In the drawings:

FIG. 9 is a top isometric view of as second embodiment of a rebar clip placed on two transverse rebars; and, FIG. 10 is an isometric view of a third embodiment showing a short segment of a series of collated rebar clips as set forth in FIG. 9 having top portions attached to a thin strip of tape.

Figure 1:
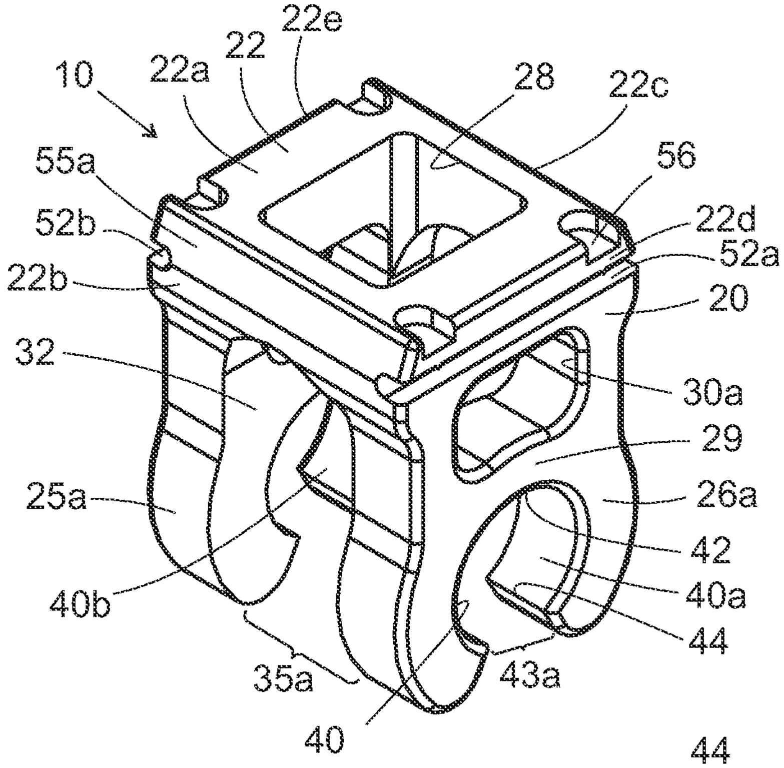
FIG. 1 is a top isometric view of an embodiment of a rebar clip showing the front and right sides of the clip.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Figure 7:
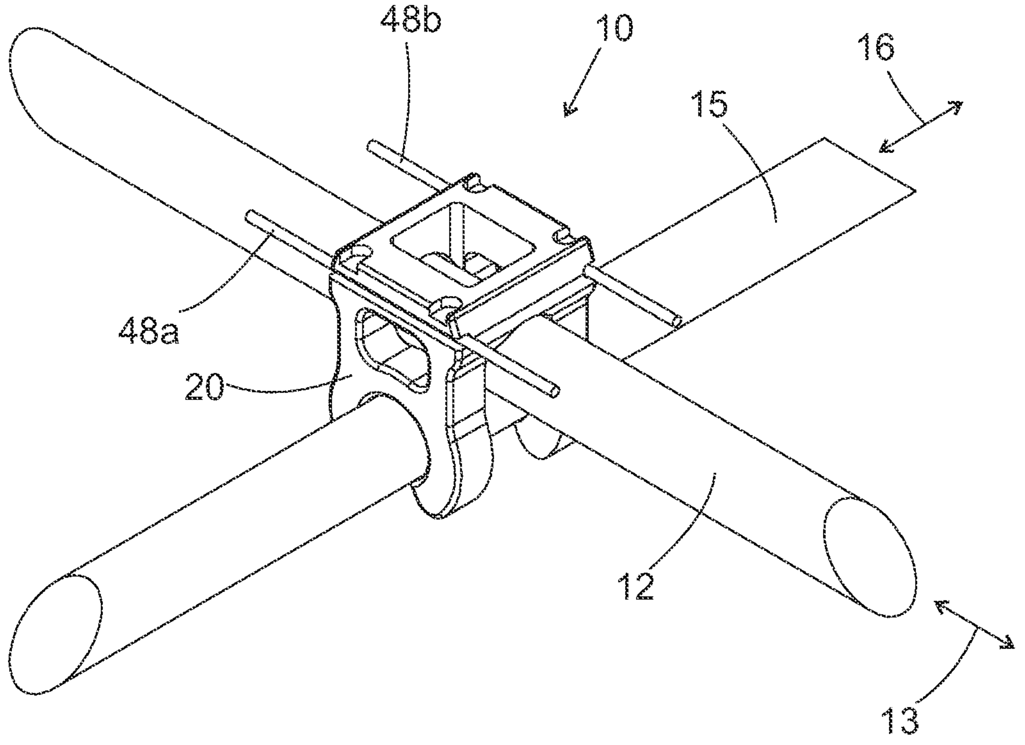
FIG. 7 is a top isometric view of a rebar clip in FIG. 1 applied to two orthogonal overlapping segments of rebar with severed carriers attached to and extending from the rebar clip.

As seen in FIG. 7, a rebar clip, generally designated 10, is shown positioned over a first rebar 12 extending axially in a first direction indicated by double arrow 13 and a second rebar 15 underlying the first rebar 12 extending axially in a second transverse direction indicated by double arrow 16. Herein, the first rebar 12 and the second rebar 15 are orthogonally arranged and in contact with one another.

Referring to FIGS. 1-6, the rebar clip 10 is seen to include a body 20 that is preferably fabricated or molded as a unitary piece from polycarbonate, or other suitable plastic or material. Herein, the body is deemed to be a unitary structure formed as a single piece and does not include a structure formed by joining or assembling several pieces together. The rebar clip 10 may be made in different sizes to accommodate rebar of varying dimensions.

The body 20 has a top portion 22 and a bottom portion 23 including longitudinal side walls 25*a*,25*b* and lateral side walls 26*a*,26*b*. The top portion 22 has an upper face 22*a* and a peripheral edge defined by longitudinal peripheral edge faces 22*b*,22*c* and lateral peripheral edge faces 22*d* and 22*e*. A vertical channel 28 extends downwardly from the flat face of the top portion 22 through the body 20 to the bottom of the clip 10. The top-opening vertical channel provides a means for positional indexing during molding of the clips and during installation of clips with an applicator tool. Above crossbars 29 are through openings 30*a*,30*b*.

Note that the terms "longitudinal" and "lateral" as used herein are employed only to facilitate describing elements of the rebar clip and their arrangement and do not denote any particular direction or limitation An axial longitudinal channel 32 located between the spaced, opposed lateral side walls 26*a*,26*b* extends through the longitudinal side walls 25*a*,25*b* in the first direction 13. The longitudinal channel 32 is comprised of two spaced, axially-aligned sections, namely, longitudinal channel segments 32*a*,32*b*. The longitudinal channel segments are closed at their upper ends 34 and have gaps 35*a*,35*b* at their lower ends 36 defining longitudinally extending openings.

The longitudinal channel segments have linear internal surfaces defining a uniform nominal width and terminating at their upper ends 34 in a semicircular surface having a diameter equal to the nominal width. The width of a gap 35*a*,35*b* and the width of the longitudinal channel 32, which are slightly wider that the diametric width of the round first rebar 12, allows close fitment of the first rebar 12 within the longitudinal channel 32.

An axial lateral channel 40 located between the spaced, opposed longitudinal side walls 25*a*,25*b* extends through the lateral side walls 26*a*,26*b* in the second direction 16. The lateral channel 40 is orthogonal to and intersects the longitudinal channel 32, which has a vertical depth greater than the lateral channel 40. The lateral channel 40 is comprised of two spaced, axially-aligned sections, namely, lateral channel segments 40*a*,40*b*. The lateral channel segments are closed at their upper ends 42 and have gaps 43*a*,43*b* between the feet at their lower ends 44 defining longitudinally extending openings.

The C-shaped lateral channel 40 has a circular internal surface sweeping more than 180° such that the diametric width of lateral channel 40 is wider than the width of the gaps 43*a*,43*b* between the edges of the lateral channel 40. The diametric width of the lateral channel 40, which is slightly wider than the diametric width of the second rebar 15, allows close fitment of the round first rebar within the longitudinal channel 40.

As seen in the drawings, the diameter of the second rebar 15 is greater the nominal width of the gaps 43*a*,43*b* of the lateral channel 40. The second rebar 15 may be positioned in the lateral channel 40 by pressing the rebar clip 10 downward onto the second rebar 15 to deflect the resilient sides of the body 20 thereby widening the narrow gaps 43*a*,43*b* and allowing the second rebar 15 to pass through into the lateral channel 40. The lateral side walls 26*a*,26*b* are pushed apart by bending or deflecting as the second rebar 15 is inserted. After the second rebar 15 passes through the gaps 43*a*,43*b*, the sides spring back returning the gaps 43*a*,43*b* to their nominal width and holding the second rebar 15 within the lateral channel 40. Inwardly inclined external surfaces 46*a*,46*b* adjacent the gaps 43*a*,43*b* provide guiding cam surfaces directing the second rebar 15 into the lateral channel 40 and forcing the gaps 43*a*,43*b* to widen.

Figure 8:
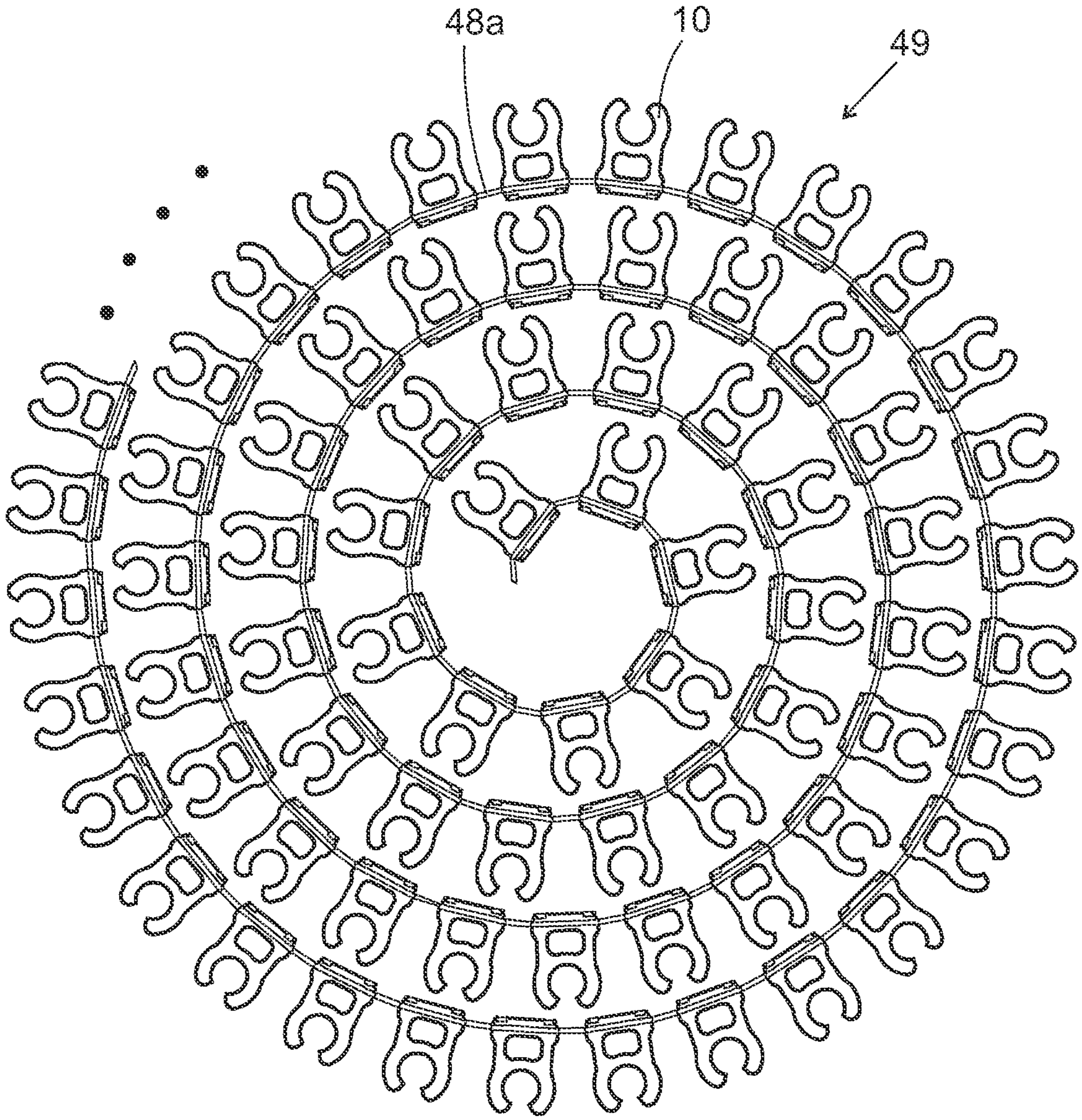
FIG. 8 is a top plan view of a plurality of collated rebar clips in FIG. 1 serially attached to a continuous carrier and coiled into a helical configuration.

As shown in FIGS. 7 and 8, a plurality of rebar clips 10 are serially arranged in end-to-end relation and are connected to a pair of elongate carrier cords 48*a*,48*b* to create a collation of rebar clips creating a fastener assembly that is formed or rolled into a coil, generally designated 49. The relatively small diameter carrier cords 48*a*,48*b* are made of polyethylene, or other plastic or suitable material, and are both flexible and easily severable.

A pair of grooves 52*a*,52*b* extending in the direction 13 of the longitudinal channel 12 are defined in the sides of the body 20 with each of the grooves 52*a*,52*b* having a dimension allowing the carrier cords 48*a*,48*b* to be placed within the grooves. Projections, such as teeth, collectively designated 53, extend downward into each groove 52*a*,52*b* to impingingly engage and retain the respective carrier cords 48*a*,48*b* within the groove by pressing the carrier cords 48*a*, 48*b* against the groove wall. The top portion 22 of the body 20 may be crimped or thermally deformed to press the teeth 53 into the carrier cords.

The front top edge 55*a* and back top edge 55*b* of the body 20 are chamfered to eliminate possible interference between adjacent rebar clips 10 when connected to the carrier cords 48*a*,48*b* and permit the rebar clips 10 to be tightly coiled into a compact collation. Formed in the flat top surface of the top portion 22 are four edge slots, collectively designated 56, that are located above the groove teeth 53.

Figure 2:
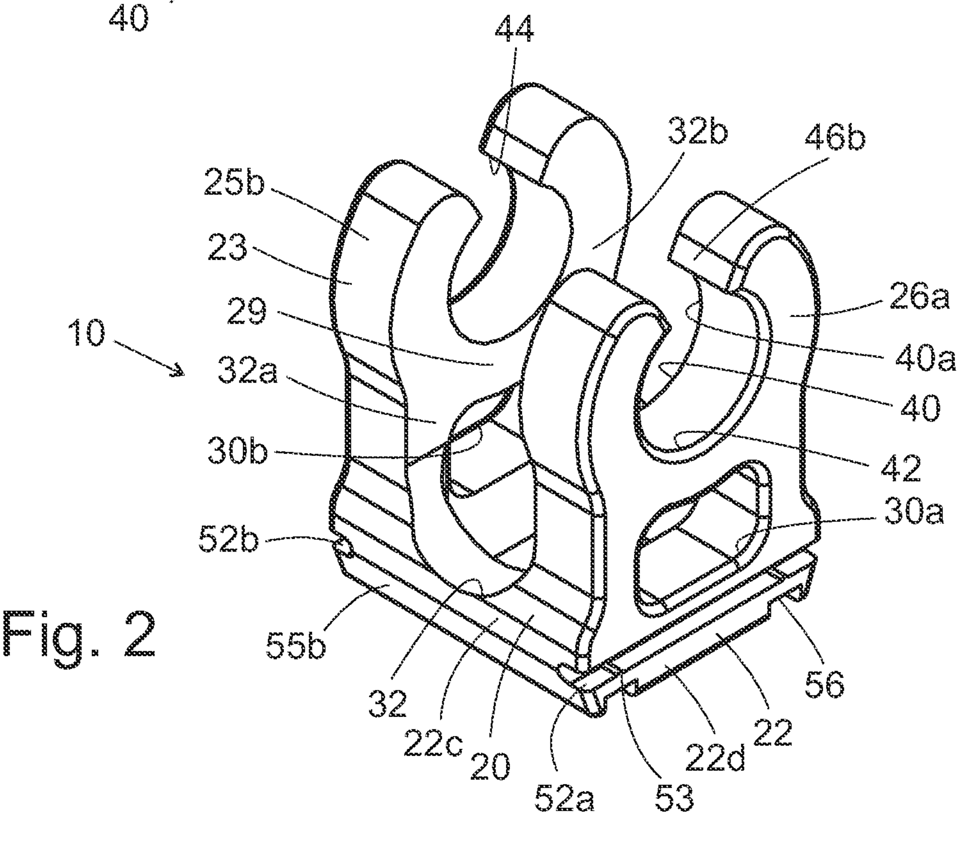
FIG. 2 is a bottom isometric view of the rebar clip in FIG. 1 showing back and right sides thereof.
Figure 3:
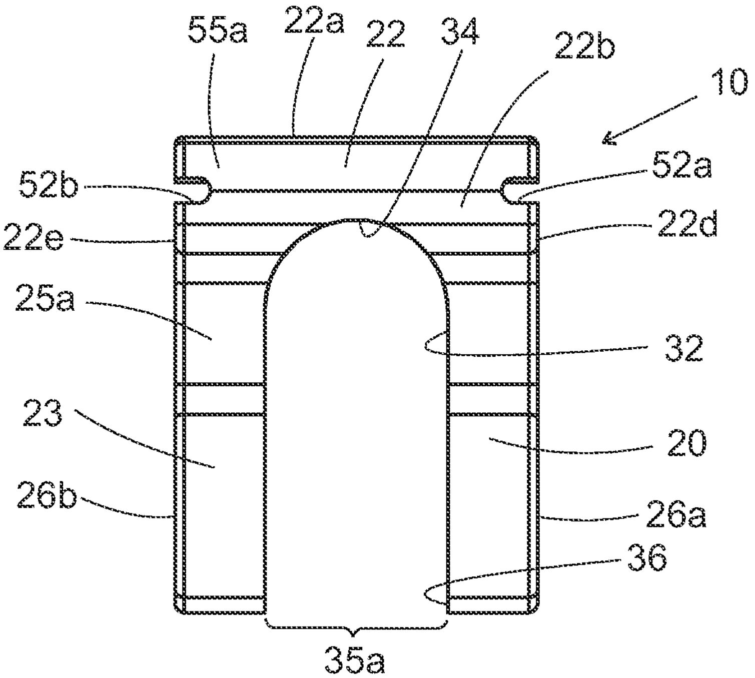
FIG. 3 is a front elevational view of the rebar clip in FIG. 1 showing the front thereof, the back having a like configuration.
Figure 4:
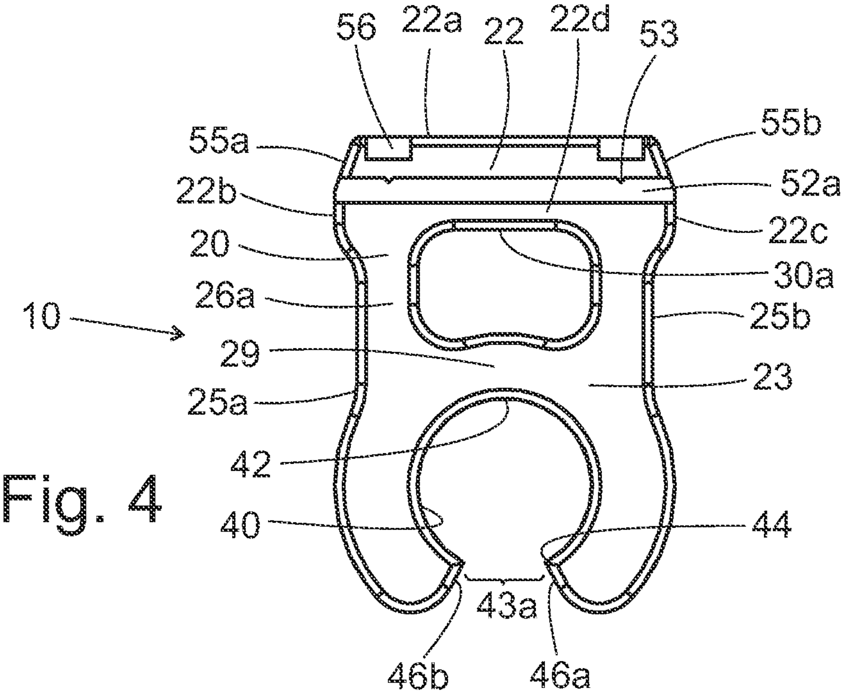
FIG. 4 is a side elevational view of the rebar clip in FIG. 1 showing the right side thereof, the opposite side having a like configuration.
Figure 5:
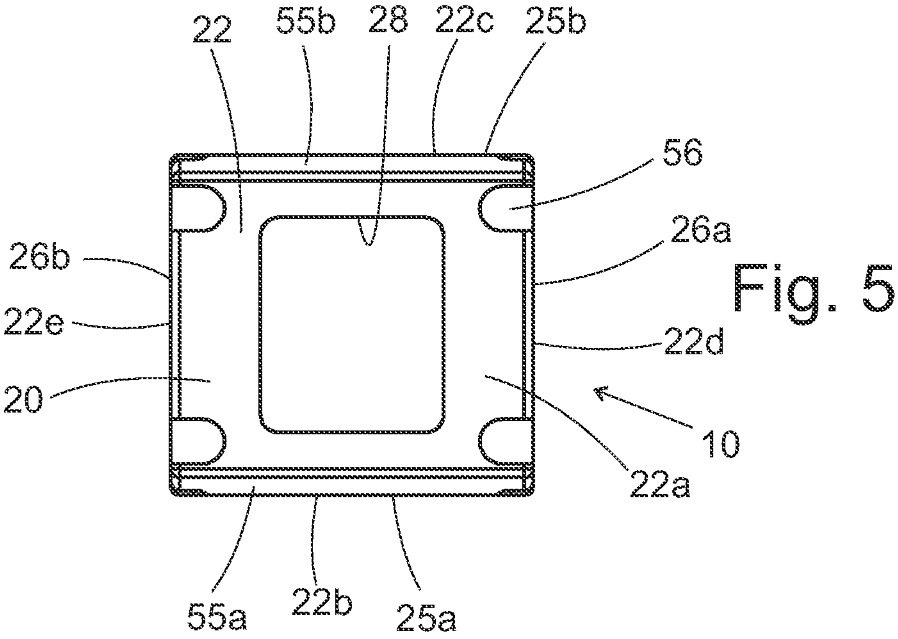
FIG. 5 is a top plan view of the rebar clip in FIG. 1 showing the top thereof.
Figure 6:
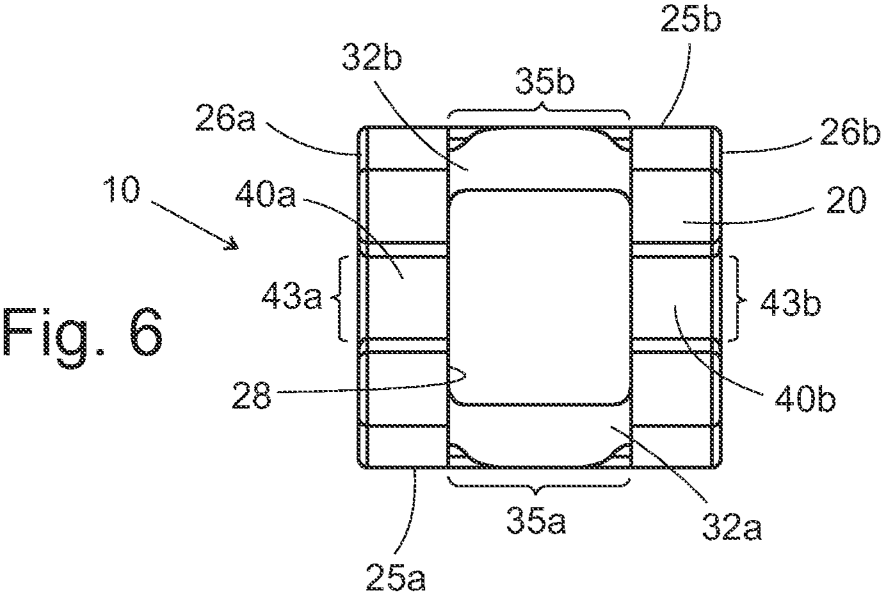
FIG. 6 is a bottom plan view of the rebar clip in FIG. 1 showing the bottom thereof.

As best seen in FIG. 2, the intersecting channels 32,40 separate the clip body 20 into four downwardly extending finger-like leg sections such that adjacent sections will be opposingly disposed about each of the rebars 12,15 when the clip 10 is placed thereon. The top portion 22 connecting the upper ends of each leg with the upper ends of adjacent legs. When the first rebar 12 and second rebar 15 are located in adjoined relation within the rebar clip 10, the first rebar 12 is held in the upper part of the longitudinal channel 32 by the underlying second rebar 15 that will bear against it. In turn, the second rebar 15 is held within the lateral channel 40 by the leg edges adjacent the narrow gaps 43*a*,43*b*. The vertical distance between the longitudinal channels upper ends 34 and the lateral channel lower ends 44 is at least as great as the combined diametrical widths of the first rebar 12 and the second rebar 15.

When a rebar clip 10 is applied to overlapping rebars, the rebar clip 10 is removed from the remaining clips connected to the coil 40 by severing the carrier cords 48*a*,48*b*. The severed carrier cords 48*a*,48*b* may remain connected to the clip 10.

When rebar clips are coiled as described, a large number of clips can be handled in a single reel, or collation, which saves time and effort when being manufactured and when being employed by an end user as it reduces the number of times the magazine of an applying tool has to be reloaded.

It is understood that a large diameter coil of rebar clips as disclosed herein may contain hundreds of clips and may be arranged in a traverse coil.

In FIG. 9, a second embodiment of a rebar clip, generally designated 110, ties a longitudinally extending rebar 112 to a laterally extending rebar 115 that underlies the longitudinal rebar 112. The clip 110 is made as a unitary piece from polycarbonate or other suitable material. The clip 110 has a body 120 including an upper portion 122 with an upper face 122*a* and a lower portion 123 with four legs, collectively designated 124, defining two intersecting channels 132, 140. Longitudinal channel 132 is U-shaped and extends longitudinally and lateral channel 140 is generally C-shaped and extends laterally orthogonal to channel 132. The U-shaped longitudinal channel 132 has a depth greater than the C-shaped lateral channel 140.

As seen in FIG. 9, when the clip 110 placed over the rebars 112,115, the longitudinal rebar 112 will overlie and be orthogonal to the lateral rebar 115. The legs 124 have at their lower ends inwardly extending feet, collectively designated 144, that partially close the gap at the lower end of the channel 140 to hold the lateral rebar 115 within the C-shaped lateral channel 140. In turn, the underlying lateral rebar 115 holds the longitudinal rebar 112 up within the U-shaped longitudinal channel 132. When the clip 110 is placed over the rebars 112,115, the four legs 124 extend downward along the sides of the rebars 112,115 fixedly tying the rebars 112,115 together.

A rebar clip 110, a plurality of which may be serially arranged in end-to-end relation, is connected to a pair of longitudinally extending carrier cords 148*a*, 148*b* to create a long, longitudinal, collated string of rebar clips 110. Both of the relatively small diameter carrier cords 148*a*, 148*b* are made of polyethylene, or other suitable material, and are flexible and easily severable. Preferably, the carrier is made or fabricated from material softer than that of the clip.

A pair of longitudinally extending grooves 152*a*, 152*b* are defined in the lateral faces of the clip 110 with each of the grooves 152*a*, 152*b* having a dimension allowing the carrier cords 148*a*, 148*b* to be placed within the respective grooves 152*a*, 152*b*. Projecting teeth, collectively designated 153, extend downward into each of the grooves 152*a*, 152*b* to impingingly engage and retain the respective carrier cords 148*a*, 148*b* within their respective grooves 152*a*, 152*b* by pressing the carrier cords 148*a*, 148*b* against the groove wall opposite the teeth 153.

Adjoining the longitudinal peripheral faces of the top portion 122 and extending upward from the clip 110 are a pair of laterally extending ribs 157*a*, 157*b*. The ribs 157*a*, 157*b* are separated by a laterally extending recess 158 lying below the upper face 122*a* of the clip 110 intermediate the longitudinal peripheral faces.

In FIG. 10, a plurality of clips 110 forming a fastener assembly are shown adhesively attached to a thin elongate strip of carrier tape 170 to form a short collated series of clips. The tape 170 is made of suitable material that is both flexible and severable.

From the foregoing, it will be observed that numerous variations and modifications may be effected without departing from the spirit and scope of the invention.

It will also be observed that the various elements of the invention may be in any number of combinations, and that all of the combinations are not enumerated here. It will be understood that no limitation with respect to the specific apparatus illustrated herein is intended or should be inferred. While specific embodiments of the invention have been disclosed, one of ordinary skill in the art will recognize that one can modify the materials, dimensions and particulars of the embodiments without straying from the inventive concept.

Other aspects, objects and advantages of this invention can be obtained from a study of the drawings and the foregoing disclosure.

It should be understood that the terms "top," "bottom," "upper," "lower," "inner," "outer," "end," "front," "back," "side," "first," "second," "height," "width," "length," and similar terms as used herein, have reference only to the structure shown in the drawings and are utilized only to facilitate describing the invention. The terms and expressions employed herein have been used as terms of description and not of limitation.

As used herein, the term "adjoin" shall mean "to be close to or in contact with"; the term "within" shall mean "to be partially or completely inside of"; the term "axial" refers to a direction that is substantially straight; the term "transverse" refers to a direction that crosses another direction (e.g., orthogonal or nonorthogonal); the term "longitudinal" refers to a direction running generally lengthwise, e.g., from front to back; and, the term "lateral' refers to a direction running generally side to side.

What is claimed is:

1. A fastener assembly for tying a first rebar extending in a first direction to an underlying second rebar extending in a second direction transverse to the first direction, the fastener assembly comprising:

a plurality of plastic clips arranged serially in end-to-end relation, each clip having a unitary body with a top portion, a first longitudinal side wall, a second longitudinal side wall longitudinally spaced from the first longitudinal side wall, a first lateral side wall, a second lateral side wall laterally spaced from the first lateral side wall, the top portion having a generally downwardly extending periphery, the side walls extending downwardly from the periphery of the top portion;

a first channel passing through the longitudinal side walls and extending between the lateral side walls, the first channel having an open lower end, a closed upper end, and a width allowing the first rebar to be closely positioned therein;

a second channel passing through the lateral side walls and extending between the longitudinal side walls, the lateral side walls having an open lower end, a closed upper end, and a width allowing the second rebar to be closely positioned therein, the lower ends of the lateral side walls forming a constriction in the second channel to define a gap narrower than the width of the second channel; and a flexible severable carrier extending longitudinally from the clip at one end of the serially-arranged clips to the clip at the other end of the serially-arranged clips, the carrier being attached to and extending longitudinally along a lateral peripheral face of the top portion of each clip, the lateral peripheral face including a groove, the carrier being at least partially disposed within and extending along the groove, wherein the top portion has at least one projection extending into the groove to engage the carrier and hold the carrier within the groove, whereby an individual clip may be detached from the other clips of the fastener assembly when the first rebar and the second rebar are tied together.

2. The fastener assembly of claim 1 wherein the first channel and the second channel are orthogonal to one another.

3. The fastener assembly of claim 1 wherein the depth of the longitudinal channel is greater than the depth of the lateral channel.

4. The fastener assembly of claim 3 wherein the first channel and the second channel intersect allowing the second rebar to bear against an overlying first rebar.

5. The fastener assembly of claim 1 wherein the top portion of the clip has an upper face, a pair of spaced lateral peripheral faces, and a pair of spaced longitudinal peripheral faces.

6. The fastener assembly of claim 5, further comprising a plurality of grooves formed in the top portion and a plurality of carriers, one carrier being at least partially disposed within and extending along each of the grooves.

7. The fastener assembly of claim 5 wherein a groove is defined in each of the lateral peripheral faces of the top portion and extends longitudinally.

8. The fastener assembly of claim 5 wherein the top face of the top portion includes a laterally extending recess intermediate the longitudinal peripheral faces to form a pair of spaced ribs in the top portion adjoining the longitudinal peripheral faces.

9. The fastener assembly of claim 1 wherein the material from which the clips are fabricated is polycarbonate.

10. The fastener assembly of claim 1 wherein the material from which the carrier is fabricated is polyethylene.

11. The fastener assembly of claim 1 wherein the material from which the carrier is fabricated is softer than the material from which the clips are fabricated.

12. The fastener assembly of claim 1 wherein the carrier is a round cord attached to the clips.

13. The fastener assembly of claim 1 wherein the carrier is a tape strip adhesively attached to the clips.

14. The fastener assembly of claim 1 wherein the fastener assembly is nonlinear.

* * * * *